No. 873,520. PATENTED DEC. 10, 1907.
M. R. DÜNNEBIER.
MACHINE FOR MANUFACTURING ENVELOPS.
APPLICATION FILED DEC. 22, 1903.

7 SHEETS—SHEET 1.

Witnesses:
Thomas Durant
Alexander S. Stuart

Inventor:
Max R. Dünnebier
by Church & Church
his Attys

No. 873,520.  
PATENTED DEC. 10, 1907.  
M. R. DÜNNEBIER.  
MACHINE FOR MANUFACTURING ENVELOPS.  
APPLICATION FILED DEC. 22, 1903.

7 SHEETS—SHEET 3.

Witnesses:  
Thomas Durant  
Alexander S. Stewart

Inventor:  
Max R. Dünnebier  
by Church & Church  
his Attys

No. 873,520. PATENTED DEC. 10, 1907.
M. R. DÜNNEBIER.
MACHINE FOR MANUFACTURING ENVELOPS.
APPLICATION FILED DEC. 22, 1903.

7 SHEETS—SHEET 4.

Witnesses: Inventor:

No. 873,520. PATENTED DEC. 10, 1907.
M. R. DÜNNEBIER.
MACHINE FOR MANUFACTURING ENVELOPS.
APPLICATION FILED DEC. 22, 1903.
7 SHEETS—SHEET 5.
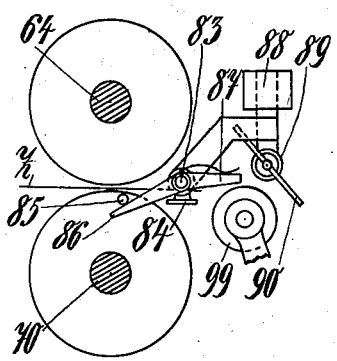
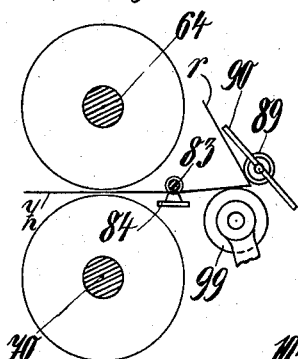
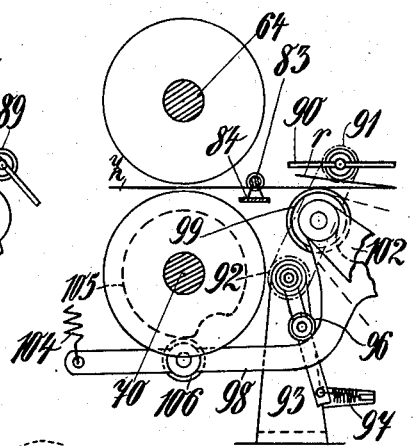
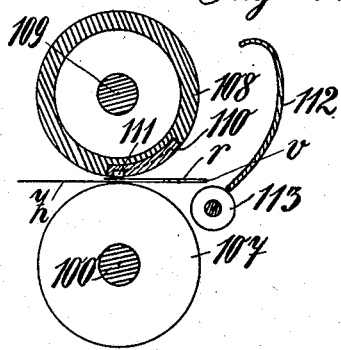
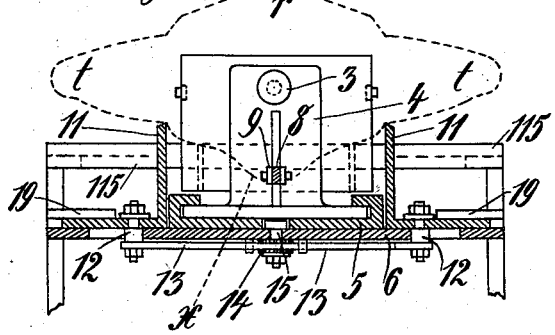
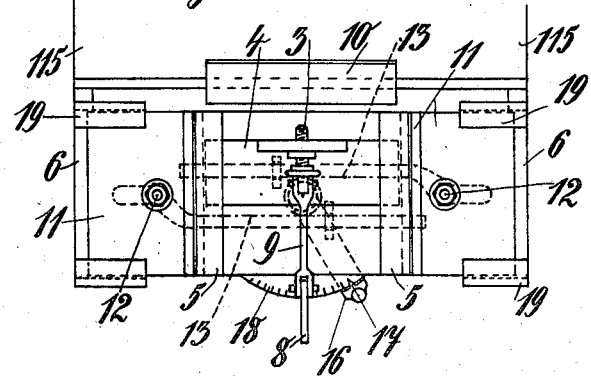
Witnesses:
Thomas Durant
Alexander S. Stewart
Inventor:
Max R. Dünnebier
by Church & Church
his attys No. 873,520. PATENTED DEC. 10, 1907.
M. R. DÜNNEBIER.
MACHINE FOR MANUFACTURING ENVELOPS.
APPLICATION FILED DEC. 22, 1903.

7 SHEETS—SHEET 7.

Witnesses:
Inventor:
Max R. Dünnebier
his Attys

UNITED STATES PATENT OFFICE.

MAX REINHOLD DÜNNEBIER, OF DRESDEN, GERMANY, ASSIGNOR TO CARL HERZBERG, OF COLOGNE, GERMANY.

MACHINE FOR MANUFACTURING ENVELOPS.

No. 873,520.      Specification of Letters Patent.      Patented Dec. 10, 1907.

Application filed December 22, 1903. Serial No. 186,192.

*To all whom it may concern:*

Be it known that I, MAX REINHOLD DÜNNEBIER, a subject of the King of Saxony, residing at Dresden A, Saxony, Empire of Germany, have invented certain new and useful Improvements in Machines for Manufacturing Envelops, of which the following is a specification.

This invention relates to an improved machine for manufacturing envelops, or paper inclosures and is chiefly characterized by the fact that the forming of the blanks into envelops or inclosures is effected by passing them through a set of rollers. This way of manufacturing enables the procedure to be a continuous one, and makes the machine capable of giving a large output and it is therefore suitable for manufacturing on a large scale.

The invention further relates to devices for separate guidance of the blank from the pile to the set of rolls, for folding, gumming and pressing the flaps.

The invention comprises, finally, the devices for setting the machine so as to render it suitable for manufacturing envelops or inclosures of various sizes.

Figure 1:
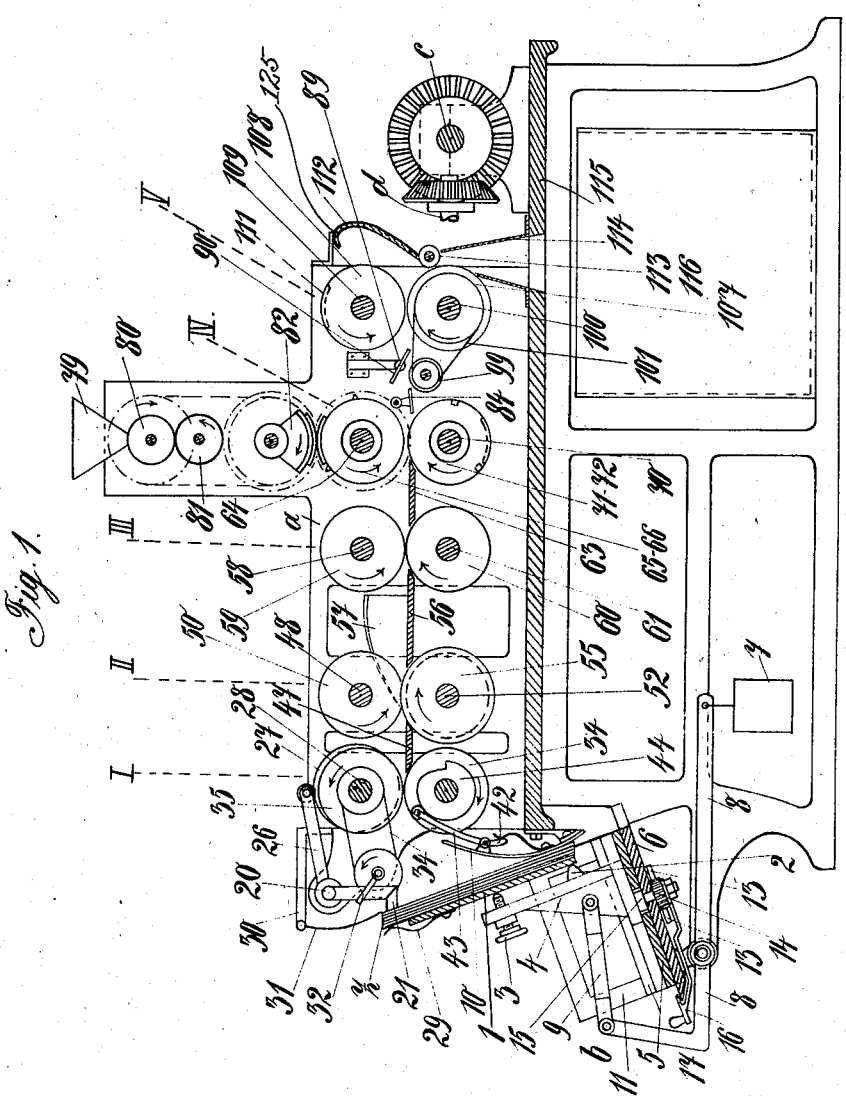
Figure 2:
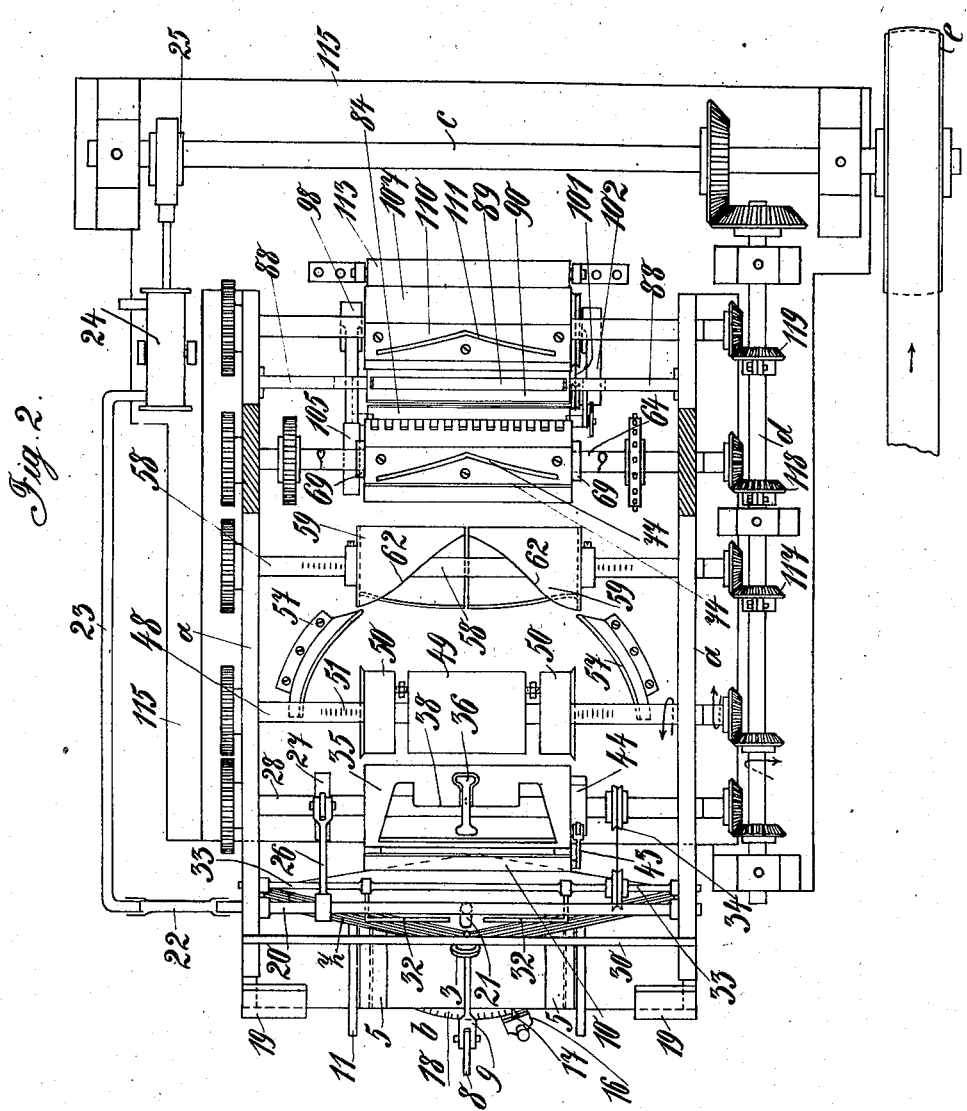
Figure 3:
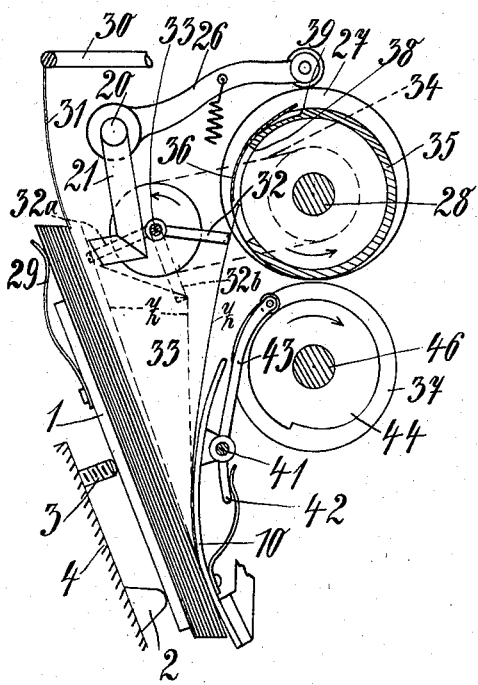
Figure 4:
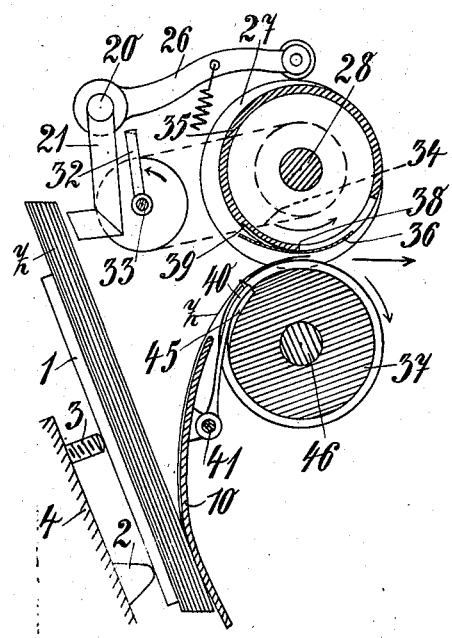
Figure 5:
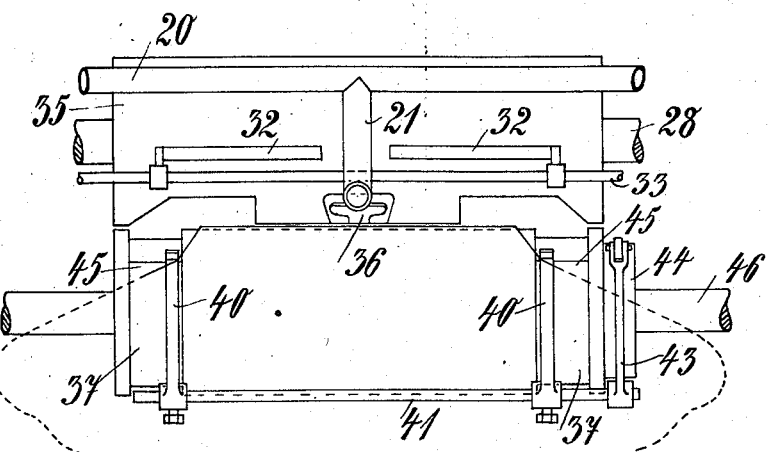
Figure 6:
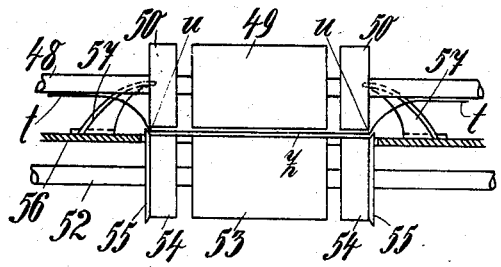
Figure 7:
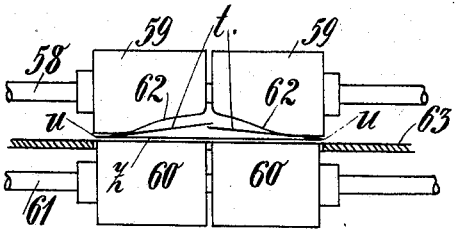
Figure 8:
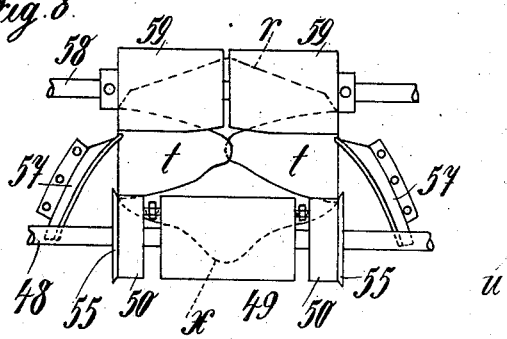
Figure 9:
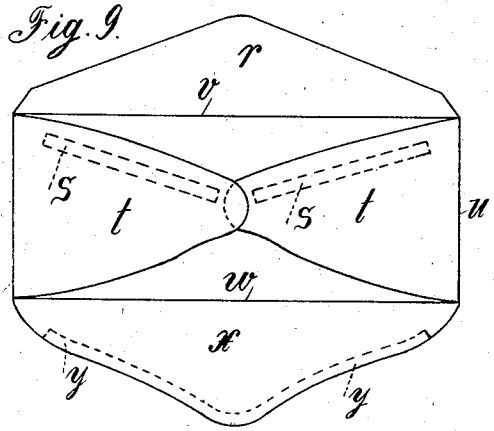
Figure 10:
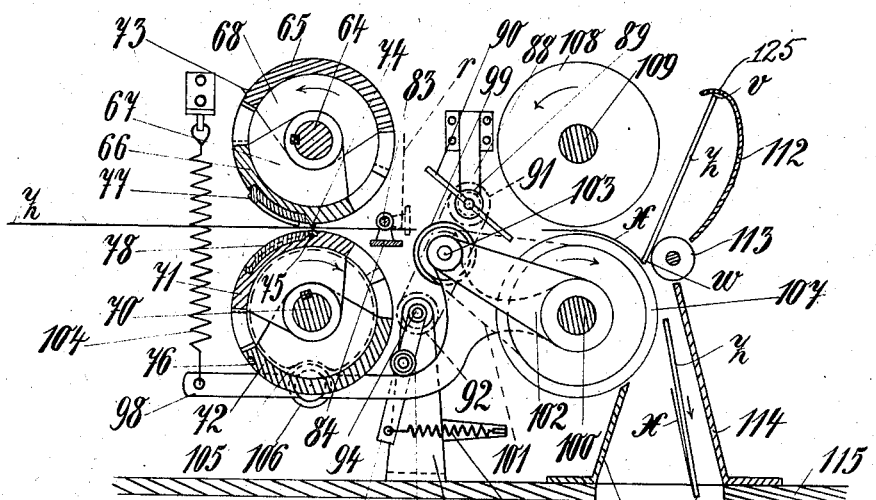
Figure 17:
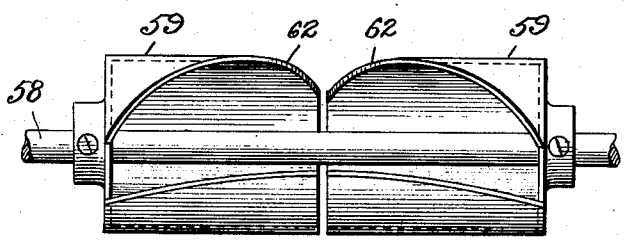
Figure 18:
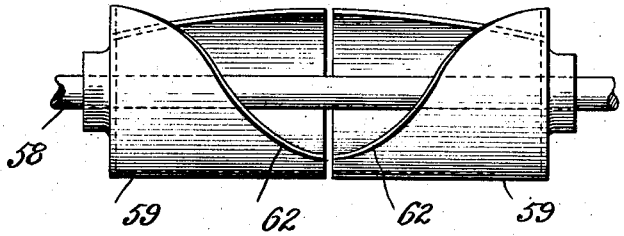
Figure 19:
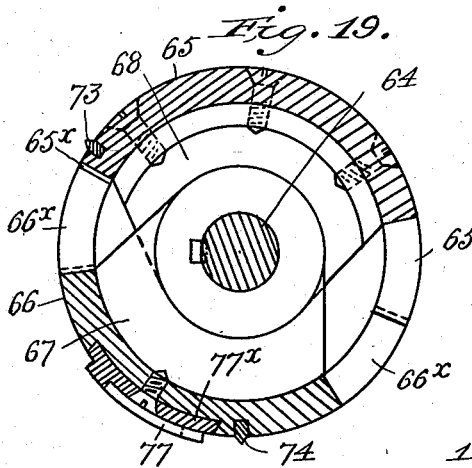
Figure 20:
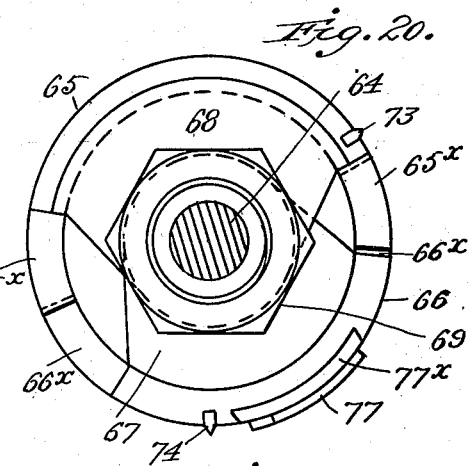
Figure 21:
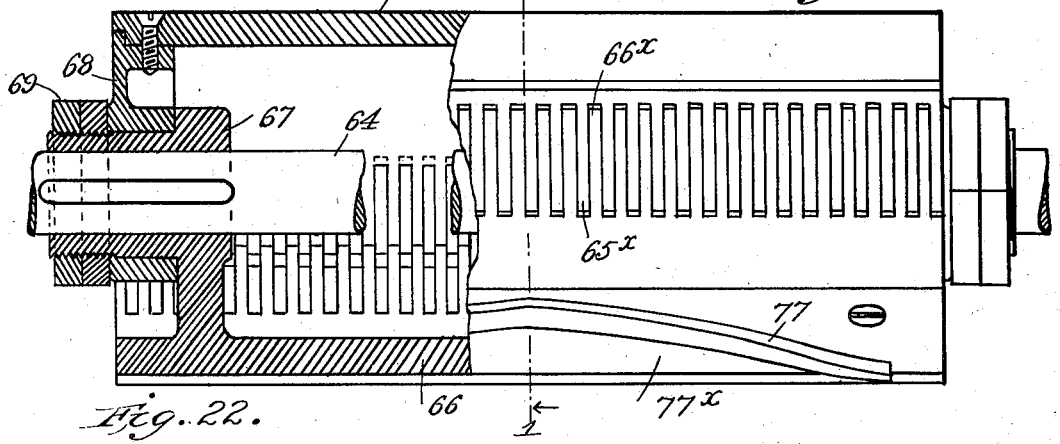
Figure 22:
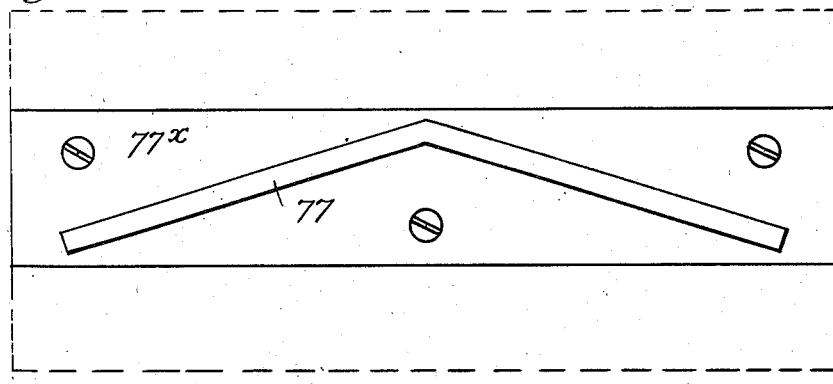

A machine according to this invention is illustrated, by way of example, in the accompanying drawings, in which Figure 1 is a central vertical section through the complete machine; Fig. 2 a plan of the complete machine, the gumming device being omitted; Figs. 3 and 4 are vertical sections of the first pair of rolls with the feeding device, Fig. 3 showing the lower roll in elevation; Fig. 5 is a front elevation of the first pair of rolls with the feeding device, certain parts having been left out, the view being taken from the left hand side with reference to the Figs. 3 and 4; Fig. 6 is a front elevation of the second pair of rolls and of the parts coöperating with them, which produce the lines for folding lateral flaps; Fig. 7 is a front elevation of the third pair of rolls which does the folding and the pressing of the side flaps; Fig. 8 is a plan of the second and third pairs of rolls seen from above, together with the curved guides bringing about the folding of the side flaps; Fig. 9 shows the blank with the side flaps folded; Fig. 10 is a vertical section, partly in elevation, of the fourth and fifth pairs of rolls, together with the devices which, in coöperation with the rolls, effect the folding and the pressing down of the two large flaps, as well as the delivery or discharge of the finished article; Figs. 11 to 13 show diagrammatically in side elevation, the fourth pair of rolls with the means for folding the large flap that has to be glued fast, in various positions; Fig. 14 shows diagrammatically in side elevation the last pair of rolls with the guide for the now completed article, and the discharge roll; Fig. 15 is a front elevation, partly in section; and, Fig. 16 a plan of one portion of the feeding device. Figs. 17 and 18 are detail perspective views of the roll for folding down the side flaps, taken from opposite sides of the roll. Fig. 19 is a sectional view of roll and shaft 64 on line 1—1, Fig. 21. Fig. 20 is an end elevation with the shaft in section. Fig. 21, is a view partly in elevation, with parts broken away and in section. Fig. 22 is a detail view of the plate carrying the gumming rib.

The various pairs of rolls, together with the gumming device and other devices coöperating with the rolls, are supported in side plates $a$ of the frame. At one end of the frame is supported the fixed part of the feeding device $b$ (Fig. 2), at the other end, a transverse driving shaft $c$ from which the rolls are driven by means of an intermediate longitudinal spindle $d$ and of the bevel wheels shown in Fig. 2. The driving pulley is marked $e$.

The machine illustrated is intended to produce envelops as shown in Fig. 9, from suitably cut blanks. The shape of the blank $z$ is shown dotted in Fig. 15 and corresponds with the shape of the envelop shown in Fig. 9 after unfolding the flaps. The blanks are perfectly flat pieces of paper, already provided, however, with gum at the places marked $y\ y$ (Fig. 9), dried before the blank is introduced into the machine. This is the gum for the closing flap $x$ which must be bent or folded by the machine, but not glued. The machine produces the creases $u\ u\ v\ w$, folds the side flaps $t\ t$, provides them at $s\ s$ with gum and folds the flap $r$ which owing to the gum on flaps $t\ t$, is glued fast.

The blanks $z$ are arranged one above the other in the position which can be seen in Fig. 15, on a plate 1. Against this plate rests at the bottom a projection 2, and at the top a set-screw 3 on a slide 4. The set screw enables the pile of blanks to be placed in any desired position relatively to the other parts of the feeding device. The slide 4 can travel in a rectilinear guide 5, on the bottom plate 6, and is forced forward by a weight 7, lever 8 and rod 9 (Fig. 1), so that the front blank is pressed against a curved plate 10 secured to the machine frame a.

The side flaps t t of the blanks rest against the angle-bars 11 arranged so as to fit exactly into the angle between the flaps t and x. For the purpose of enabling the two angle bars to be adjusted simultaneously and in a very exact manner, toothed racks 13 engage with bolts 12, said toothed racks being moved simultaneously and uniformly inwards or outwards, but in opposite directions, by means of a toothed wheel 14 arranged between them. The toothed wheel rotates on a spindle 15 secured to the bedplate 6. To that wheel is connected a lever 16, the other end of which is provided with an index 17 (Fig. 2) and travels in front of a sector 18 provided with divisions. The divisions and the index enable the bars 11 to be adjusted exactly to the distance desired. When being moved inwards or outwards, the bars 11 are guided in a rectilinear direction by means of ledges 19 on the bed-plate 6.

By means of the devices described, the blanks, as they are being used up, are gradually advanced and always brought into the same position. First of all, then, the upper edge of the sheet that may be in front at the time, is pulled off from the stack. This is effected by suction.

In the frame a a rotates a hollow spindle 20 which is provided in the center with a suction finger 21, that is to say with a pipe bent to an angle and open at one end. The spindle is connected by means of a hose 22 and pipe 23 to an air-pump 24 of well known construction, the piston of which is operated by means of an eccentric 25 on the spindle c. The pump produces suction, that is to say produces a partial vacuum in the hollow spindle 20 and in the suction finger 21, in consequence of which atmospheric air pressure forces the upper edge of the blank z against the mouth of the suction finger when the latter comes against the front blank. The rocking motion required for the purpose is imparted to the hollow spindle by means of a lever 26 and a cam 27 on the roll spindle 28. A spring 29 secured to the plate 1 provides, at the same time, an elastic abutment for the upper edges of the blank, while a spring 31 (Fig. 3) secured to the frame plate a by means of a rod 30 holds back the second and the following blanks, while the first one is carried away by the suction finger and pulled from under the end of the spring.

In the position indicated in dotted lines, in Fig. 3, the suction finger has already released the front blank. The suction finger has a swinging motion and hence releases the paper as soon as the plane of the mouth of the suction finger materially deviates from the plane of the blank seized, owing to the admission of air at one side. But in the position shown in Fig. 3, revolving feeders 32 have already engaged with the back of the blank raised. The feeders are hook shaped (Fig. 2) and mounted on a spindle 33 driven from the roll spindle 28 by means of a cord 34. On continuing to rotate in the direction of the arrow (Fig. 3, position $32^b$) the feeders slightly bend the blank seized and place it finally with its upper corner against the top roll 35 of the pair of rolls I, as shown in full lines in Fig. 3. This roll 35 is a hollow cylinder provided with a recess shown in Figs. 2, 3, 4. When the feeders place the blank against the roll the recess is exactly in front of the upper corner of the blank. The latter engages with the recess and when the roll rotates, is bent down by the front edge of the spring 36 and guided towards the point of contact of the upper roll 35 with the lower roll 37. During further rotation, this corner is then seized by the rolls, pulled away from the pile and delivered to the next pair of rolls in the direction of the arrow (Fig. 4). This bending of the upper edge of the blank towards the point of contact of the rolls could be effected without the help of the spring 36 by causing the rear edge of the correspondingly narrowed recess to engage with the blank, instead of the front edge of the spring. But the spring, in coöperation with parts to be hereinafter described, has also the important function of bringing the blank into correct position relatively to the rolls, the accuracy of further work depending on the correctness of that position.

As shown in the drawing, the front portion of the spring fits the circumference of the roll 35, the back portion projecting. Owing to the use of the spring of that shape and position, instead of the recessed circumference of the upper roll, its front portion cannot press the paper with sufficient force against the lower roll to bring about the introduction of the blank into the pair of rolls. The rolls begin to withdraw the blank only after the rear edge 38 of the recess has touched the paper and pressed it against the lower roll. Then the blank is seized and caused to move. But as the circumference of the roll stands slightly back from the edge 38, the rear portion of the spring 36 takes over, immediately after the first pressing of the paper, the pressure and the driving, while the circumference of the roll again becomes for a time inoperative. This results in the blank being held for a certain time only in the center of the front corner, so that it can be moved laterally. This mobility enables any blanks that may not be quite straight, to be straightened, so that when the circumference of the roll again becomes operative at the point 39, the said blank is advanced farther in a perfectly correct and fixed position. This straightening is effected by means of two fingers 40 which are mounted on a spindle 41 supported on the curved plate 10 (Figs. 4 and 5). A spring presses on an arm 42 (Fig. 3) also mounted on the said spindle, while the other arm 43, provided with anti-friction rollers, rests on the circumference of the cam 44. The rolls draw the blank pressed upon by the rear portion of the spring 36, against these fingers, so that the said blank comes to rest against the fingers with its corners situated between the side flaps and one large flap. The blank is then held fast for a moment by the fingers, while the yielding spring 36 slides on the corner of the blank situated between it and the lower roll. When the projection of the cam 44 passes the arm 43 said arm swings back, and the fingers 40 engage with the corresponding recesses 45 of the lower roll, so that the blank is released from the fingers and is pressed against the lower roll by the circumference of the upper roll which now becomes operative, and in this way caused to advance. It must also be pointed out that the spindle 46 of the lower roll is connected to that of the upper roll by means of a pair of toothed wheels, which, however, is the case for the other pairs of rolls as well.

The corner seized by the feeding device and introduced into the first pair of rolls, is that of the large flap $r$ which therefore moves foremost during the passage of the blank through the sets of rolls. First of all the side flaps $t\,t$ are bent. This is effected by means of the pairs of rolls II and III with the coöperation of the curved guides situated between them. The blank delivered by the pair of rolls I passes over a bridge 47 to the pair of rolls II. The upper roll mounted on the spindle 48 consists of a cylindrical central portion 49 and two pulley-like lateral portions 50 of the same diameter. The lateral portions 50 can be set to suit the width of the envelop (measured between the edges $u\,u$ Fig. 9) by means of the divisions 51 on the roll spindle 48 (Fig. 2). The lower roll mounted on the spindle 52 and consisting of a central portion 53 and lateral portions 54, is of the same construction; only in this case the lateral portions 54 are provided at the outside edge with conical flanges 55. By means of these flanges the edges $u\,u$ are bent or creased in the manner shown in Fig. 6, the side flaps $t\,t$ being bent upwards. When the side flaps pass in that position under the roll spindle 48, their front edges strike the curved guide-plates 57 bent both inwards and upwards and secured to the bridge 56. This forces the flaps inwards, that is to say they are bent upwards slightly beyond the vertical position, as the curved guides, as shown in Fig. 2, come together slightly nearer than the width of the rolls of the pair II. Then the third pair of rolls becomes operative, in order to complete the bending of the flaps that is to say to put them down on the central portion of the envelop.

The upper roll on the spindle 58 is a hollow roll consisting of two parts 59. The surface of these parts is recessed in the manner clearly shown in Figs. 2, 17 and 18. The lower roll mounted on the spindle 61 and also consisting of two parts 60, is an ordinary solid or hollow roll. Both the rolls, as well as those of the pair II, are adjustable to suit the width of the envelop. While the front flap $r$ enters the pair of rolls III, the flaps $t\,t$ directed slightly obliquely inwards in the manner described, are seized by the edges 62 of the recess of the upper roll and completely turned down (Fig. 7) whereupon the now engaging circumferential part of the upper roll, in coöperation with the lower roll, presses down the bent flaps. The blank, after having passed through the pair of rolls III, appears therefore of the shape shown in Fig. 9.

Bending and gluing down the flap $r$ (Figs. 1, 2, 10, 11, 12, 13, 14) is effected by the pairs of rolls IV and V. With the first pair coöperates a gumming device, and between it and the latter is arranged an auxiliary device hereinafter described. The blank passes over the bridge 63 into the pair of rolls IV. The bridges already described 47, 56, 63, are parts of a plate secured to the frame plates $a$, and provided with corresponding recesses for the lower rolls of pairs I to IV. The hollow upper roll mounted on the spindle 64, consists of two longitudinal halves 65 and 66, inclosing each a central angle of more than 180° and engaging with each other with their toothed edges (Figs. 2 and 10). The half 66 is secured by means of its head portion 67, to the spindle 64, while the other half is loosely mounted on the said spindle by means of its head portion 68. When one half is turned relatively to the other, the diameter of the roll remains of course the same, and owing to the intermeshing of the toothed edges $65^{\times}$ and $66^{\times}$ of the halves of the roll the continuity of the circumference remains preserved, but the blades supported by the roll halves are adjusted, according to the width of the envelop measured between the edges $v\,w$, (Fig. 9), in such manner as to form a smaller or greater central angle. The loose halves are fixed, by means of the screw thread and nuts 69 see Figs. 20 and 21, to the spindle 64, so that the roll remains in the adjusted position during the work. The lower roll consisting of two halves 71 and 72 and mounted on the spindle 70, is arranged in exactly the same way and therefore does not require any description. Each of the two halves of the upper roll carries a longitudinal blade or blunt edge 73 and 74. To these blades correspond longitudinal grooves 75 and 76 of the lower roll, fitted with rubber cushions or the like. These blades and grooves are adjusted to suit the width of the envelop in such manner that the blades or ledges meet the grooves during the rotation. They serve to form or crease the edges $v$ and $w$, the blade and groove 74 and 75 forming the edge $v$, and blade and groove 73 and 76 the edge $w$.

Between the two blades 74 and 73, viz., on the half 66, is arranged a gumming rib 77 for applying gum to the flap of the envelop forming an obtuse angle. It is supported by an interchangeable segment plate $77^\times$ so that plates of different widths and bearing gumming ribs of different shapes to correspond to the flaps of envelops of different sizes and shapes may be employed, as the length of the plate, and sometimes the angle, change according to the width of the envelop. For the same reason, the segment plate 78 supported by the half 71 of the lower roll and containing a groove corresponding to the rib 77, is also made interchangeable. These parts serve to gum the flaps $t$ at the places marked $s$ $s$ in Fig. 9 during the passage of the blank $z$. The groove in the segment plate 78 prevents, during that operation, the soiling of the other roll 71—72 with gum, if the machine be working empty and there is no blank in it. The glue for the purpose is put on the rib 77 by a set of rolls of the well known type. A gum or glue reservoir 79 (Fig. 1) is open at the bottom, and an elastic roll 80 rotates under it. It delivers gum to a second elastic roll 81 from which a roll sector 82 takes it off, in its upper position, in order to transfer it, in its lower position, to the rib 77. This well known device does not require any further description. After having passed through the pair of rolls IV, the blank still has the shape indicated in Fig. 9, but the edges $v$ and $w$ are already creased and the places $s$ $s$ gummed. Then the flap $r$ which is subsequently glued fast, is bent. Behind the pair of rolls IV is mounted on a spindle 83 supported by short brackets secured to the frame $a$, a bar 84 (Fig. 10) which oscillates between the positions shown dotted and those in full lines. The oscillation is effected by means of a pin 85 on the lower roll (see Fig. 11, in which, however, as well as in Figs. 12 and 13, the two sectioned rolls are indicated merely by their circumferences). This pin presses against an arm 86 secured to the spindle 83, while a spring presses on a second arm 87 in order to restore the bar 84 to its lower or original position. After the blank has passed between the spindle and bar and under the spindle 83 to such an extent that the edge $v$ is already beyond the spindle, the bar swings quickly into the dotted position in order to swing back just as quickly. In this way the flap $r$ is first of all bent to a right angle.

Between the pairs of rolls IV and V a spindle or shaft 89, is journaled in arms 88 projecting from the frame $a$, and carried by the shaft 89 is a bar 90. A cord pulley 91 mounted on the end of the said bar is connected by means of a driving cord with a second pulley 92 (Figs. 10 and 13). On the spindle 94 of the cord pulley 92, rotatable in the bracket 93, is mounted a lever arm 95 with a roller 96 which is pulled to the right by a spring 97 when an arm 98, to be hereinafter described, swings out. The partial turning of the pulley 92 thus effected, produces then a swinging of the bar 90 from the position shown in Fig. 10 into that indicated in Fig. 13. Owing to this swinging, the flap $r$ previously bent to a right angle, is now bent inwards at a sharp angle. A pressing of that flap $r$ against the places $s$ $s$ covered with gum, does not, however, take place yet, as the glue must first be slightly dried, that is to say rendered consistent, so as to prevent it from being expressed during subsequent pressing and from spreading beyond the edges of the side flaps $t$ $t$ or those of the flap $r$. The blank passes then with the sharp angle formed by its central portion and the flap $r$, between the rolls 89 and 99 which, however, do not exercise any pressure for reasons stated. The roll 89 can freely rotate and is not driven. The roll 99, on the contrary, is driven from the spindle 100 of the bottom roll of the fifth pair of rolls, by means of a cord 101. The roll 99 is supported by arms 98 and 102 connected together by a fixed spindle 103, but rotatable about the spindle 100. A spring 104 has the tendency to raise the whole device. It becomes operative when a recess of a cam 105 mounted on the spindle 70, is opposite the roller 106 of the arm 98. (Fig. 10.) At that moment the roll 99 engages for a second with the lower surface of the blank, to which it imparts without counter-pressure, merely by friction, an impulse in the direction of movement, owing to which the arrival of the blank to the last pair of rolls is insured. This impulse is of special importance in the manufacturing of envelops of small width (measured between $v$ and $w$, Fig. 9) which might be released by the pair of rolls IV before being seized by the pair of rolls V.

The pressing of the flap $r$ against the places $s$ $s$ covered with glue, takes place in the pair of rolls V. The bottom roll 107 is an ordinary smooth roll mounted on the spindle 100. The top roll 108 on the spindle 109 is provided with an interchangeable segment plate 110 with two grooves 111, the shape and position of which are adapted to the places $s$ covered with glue, but of slightly smaller width than that of the places $s$. In this way direct pressure is exercised only on the edges of the said places, while the paper of the flap $r$ is pressed in the center of the said places only indirectly, owing to its stiffness. This way of applying pressure is intended to avoid squashing and squeezing out of the glue.

It still remains to effect the bending of the loose or closing flap $x$ and the delivery of the article (Figs. 1, 2, 10, 14). The blank $z$ is pushed by the rolls 108 and 107 with the edge $v$ against a plate 112 secured to the frame $a$. The plate is curved and guides the edge $v$ upwards, so that the blank finally comes into the position shown in Fig. 10, that is to say, strikes the upper bend 125 of the curved plate, as against an abutment. As the blank can go no further upwards, continued turning of the pair of rolls V pushes it with the edge $w$ between the bottom roll 107 and a counter pressure roll 113 arranged in front of the latter, said counter pressure roll either turning loose or being driven. By the cooperation of the rolls 107 and 113, the flap $x$ is bent inwards and pressed against the body of the envelop. After leaving the roll 113, the blank falls through a hopper or chute 114 and an opening in the bed plate 115, into a case 116.

With reference to the adjustment for various sizes of the blanks, it is necessary to mention the following. First of all, the recess of the roll 59 must have a certain definite position relatively to the blank delivered by the second pair of rolls, in order that the bending of the flap $r$ should take place correctly, and this position must vary for the different widths of envelops. To that end the bevel wheel 117, (Fig. 2) driving the third pair of rolls is provided with a hub slotted in the well known manner and held together by a screw, so as to enable it to be loosened for the purpose of adjusting the position of the recess on the spindle $d$, and then tightened again. The same arrangement is used for the bevel wheels 118 and 119 for driving the pairs of rolls IV and V. The important point in the case of the pair of rolls IV is to render the blades 73, 74 or the ledges 75 76, as well as the gumming tools 77, 78, operative exactly at the right point of the blank. The adjustment of the two-sectioned rolls can only adjust the central angle between the tools in accordance with the height of the envelop, but not the position of the said tools relatively to the blank delivered by the pair of rolls III, and which is sometimes of greater and sometimes of smaller height. This adjustment is effected by turning the pair of rolls and its driving wheel 118 relatively to the spindle $d$. To the adjustment of the pair of rolls IV must correspond that of the pair of rolls V, which is effected by turning the pair of rolls and the driving wheel 119 relatively to the spindle $d$.

It will be readily understood that by using other tools or rolls, articles of other shape, such for instance as bag shape, can be produced, without departing from the spirit of this invention. The machine illustrated can also be constructed, say in such manner as also to effect the gumming of the closing flap.

What I claim as my invention and desire to secure by Letters Patent is:—

1. In an envelop-making machine the combination with a device for feeding single blanks, a first pair of feed rolls, the upper recessed, means for bending the lifted blanks into the recess and thereby between the rolls, resilient means on the upper roll for momentarily holding the center front of the blanks only, centralizing members momentarily engaging the blanks, means for moving these members into and out of active position, a second pair of rolls parallel and close to the first and having means for creasing the side edges of the blanks, means for adjusting the length of the rolls, guides to fold the side flaps of the blanks inwards, a third pair of rolls parallel and close to the second, the upper hollow and recessed to complete the folding of the sides and to press the blanks on the lower roll, means for adjusting the length of the rolls, a fourth pair of rolls parallel and close to the third, the upper provided with longitudinal blades for creasing the blanks along the end flaps, the lower having corresponding abutments, means for varying the distance between the blades and between the abutments, a removable gumming ledge on the upper roll, means for supplying it with gum, a corresponding removable grooved piece on the lower roll, a swinging bar oscillating towards the blanks discharged from the fourth rolls and arranged to fold the bottom flap of the blanks, a feed roll intermittently coöperating with the bar, a fifth pair of rolls parallel and close to the fourth, the upper roll having a removable grooved piece arranged to coincide with the gummed parts and fasten the flaps, a curved plate arranged to arrest the blanks as discharged, an auxiliary roll arranged to fold the lid of the blanks and deliver them, means for driving the rolls and means for rotatably adjusting the rolls.

2. In an envelop-making machine the combination with means for feeding single blanks of a pair of rolls having means for creasing the blanks along the edges of the said flaps, guides to fold the side flaps of the blanks inwards and a pair of rolls parallel and close to the creasing rolls, the upper hollow and recessed to complete the folding of the sides and to press the blanks on the lower roll and means for adjusting the length of the rolls.

3. In an envelop-making machine the combination with means for feeding single blanks, roll mechanism for creasing the blanks along the edges of the side flaps and folding the side flaps inwards, a pair of rolls parallel and close to the former rolls, the upper provided with longitudinal blades for creasing the blanks along the edges of the top and bottom flaps, the lower having corresponding abutments, means for varying the distance between the blades and between the abutments, a removable gumming ledge on the upper roll, means for supplying it with gum, and a corresponding removable grooved piece on the lower roll.

4. In an envelop-making machine the combination with means for feeding single blanks, roll mechanism for creasing the blanks along the edges of the side flaps, means for folding and rolling the side flaps of the blanks, roll mechanism for creasing the blanks along the edges of the top and bottom flaps and for gumming the side flaps, a swinging bar oscillating towards the blanks discharged from the last named rolls and arranged to fold the bottom flaps of the blanks, and a feed roll intermittently coöperating with the bar.

5. In an envelop-making machine the combination with a first roll device for feeding single blanks, a second roll mechanism for creasing the blanks along the edges of the side flaps, stationary means and a third roll mechanism for folding the side flaps of the blanks, a fourth roll mechanism for creasing the blanks along the edges of the top and bottom flaps and for gumming the side flaps, oscillating means for folding in the bottom flap, a fifth pair of rolls parallel and close to the fourth, the upper roll having a removable grooved piece arranged to coincide with the gummed parts and fasten the flaps.

6. In an envelop-making machine the combination with a device for feeding single blanks, roll mechanism for creasing the blanks along the edges of the side flaps, means for folding and rolling the side flaps of the blanks, roll mechanism for creasing the blanks along the edges of the top and bottom flaps and for gumming the side flaps, oscillating means for folding the bottom flap, roll mechanism for fastening down the flaps, a curved plate arranged to arrest the blanks as discharged and an auxiliary roll arranged to fold the lids of the blanks and deliver them.

7. In an envelop-making machine the combination with a device for feeding single blanks, a series of pairs of rolls provided and coöperating with means for creasing, folding, gumming, and fastening the flaps of the blanks, means for driving the rolls and means for rotatably adjusting any roll relatively to the driving mechanism.

8. In an envelop making machine the combination of mechanism for feeding single blanks, roll mechanism for creasing the side edges of the blanks, rigidly secured curved guides arranged to fold the side flaps of the blanks and a pair of rolls parallel and close to the former rolls, the upper hollow and recessed to complete the folding of the side flaps and to press the blanks on the lower roll and means for adjusting the length of the rolls.

9. In an envelop-making machine, the combination with means for feeding single blanks, roll mechanism for creasing the side edges and folding the side flaps inwards, a pair of rolls parallel and close to the former rolls, the upper provided with longitudinal blades for creasing the transverse edges of the blank, the lower having corresponding abutments, each comprising two portions separated longitudinally engaging one another with toothed edges and arranged to be relatively adjustable and to be fixed in position to enable the distance between the blades or abutments to be altered to suit the height of the blank.

10. In an envelop-making machine, the combination with means for feeding single blanks, roll mechanism for creasing and folding the side flaps inwards, a pair of rolls parallel to the former rolls, longitudinal blades on the upper roll for creasing the blanks along the edges of the top and bottom flaps, corresponding abutments on the lower roll, means for varying the distance between the blades and between the abutments, a removable plate, fixed to the upper roll, a gumming ledge on the plate, means for supplying it with gum and a removable plate fixed to the lower roll and grooved to correspond with the ledge.

11. In an envelop-making machine the combination with means for feeding single blanks, roll mechanism for creasing the blanks along the edges of the side flaps, means for folding and rolling the side flaps of the blanks, roll mechanism for creasing the blanks along the edges of the top and bottom flaps and for gumming the side flaps, a swinging bar oscillating towards the blanks discharged from the gumming rolls and arranged to fold the bottom flap of the blanks, a pivoted bracket a feed roll supported on said pivoted bracket and a cam on one gumming roll engaging with the bracket to cause the feed roll to intermittently come in contact with the blanks.

12. In an envelop-making machine the combination with a first roll device for feeding single blanks, a second roll mechanism for creasing the blanks along the edges of the side flaps, stationary means and a third roll mechanism for folding the side flaps of the blanks, a fourth roll mechanism for creasing the blanks along the edges of the top and bottom flaps and for gumming the side flaps, oscillating means for folding the bottom flap, a fifth pair of rolls parallel and close to the fourth, the upper roll having a removable piece with a groove arranged to coincide with the gummed parts and slightly smaller than these parts so as to fasten the flaps without pressing out the gum.

13. In an envelop-making machine the combination with a device for feeding single blanks, roll mechanism for creasing the blanks along the edges of the side flaps, means for folding and rolling the side flaps of the blanks, roll mechanism for creasing along the edges of the top and bottom flaps of the blanks and for gumming the side flaps, oscillating means for folding the bottom flap, roll mechanism for fastening down the flaps, a curved plate arranged to arrest the blanks as discharged and an auxiliary roll arranged in contact with the lower fastening roll to fold the lids of the blanks and deliver them.

14. In an envelop-making machine the combination with a device for feeding single blanks, a series of bars and rolls provided and coöperating with means for creasing the edges, folding, gumming and fastening the flaps of the blanks, a series of spindles respectively supporting the rolls, a beveled pinion on each spindle, a driving shaft at right angles to the spindles, a series of beveled pinions on the shaft engaging with the spindle pinions and longitudinally movable on the shaft to allow of rotary adjustment of the spindles.

In testimony whereof I have signed my name to this specification in the presence of two subscribing witnesses.

MAX REINHOLD DÜNNEBIER.

Witnesses:
CARL GREIERT,
OTTO WOLFF.